J. W. ANDERSON, Jr., AND A. R. ANDERSON.
COMBINED MOTOR AND FUEL CONTROL.
APPLICATION FILED NOV. 6, 1916.

1,346,477.

Patented July 13, 1920.

2 SHEETS—SHEET 1.

John W. Anderson Jr. Inventors
Albert R. Anderson

By N. S. Anstutz

Attorney

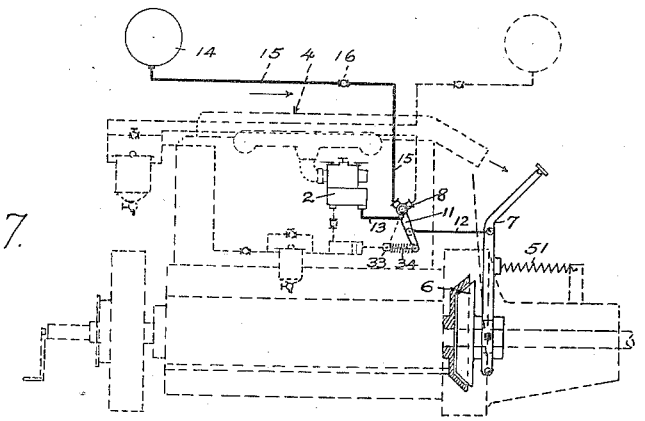
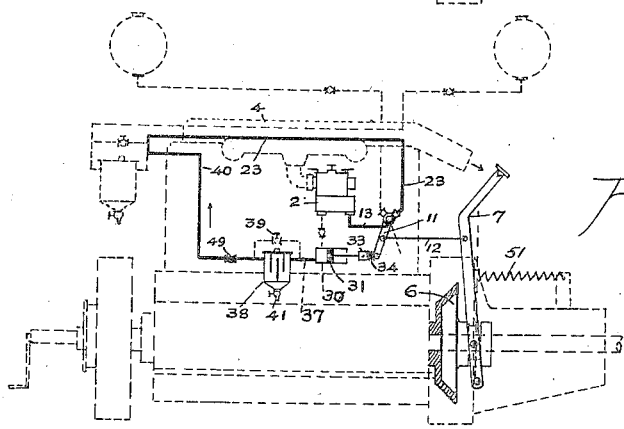
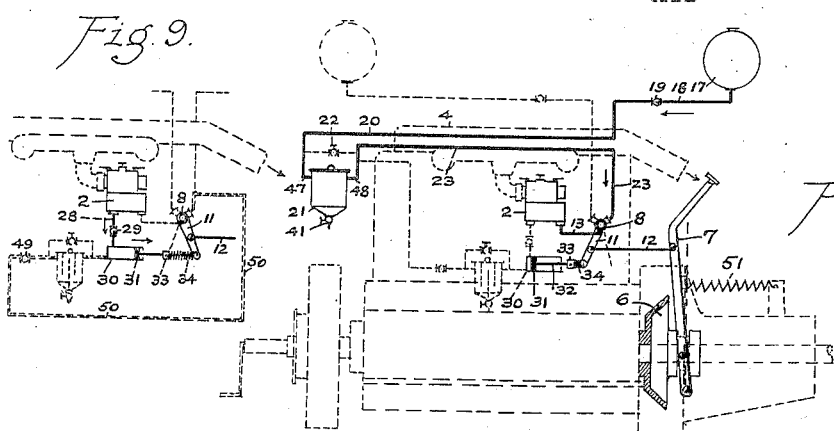

UNITED STATES PATENT OFFICE.

JOHN W. ANDERSON, JR., OF MISHAWAKA, INDIANA, AND ALBERT R. ANDERSON, OF CHICAGO, ILLINOIS, ASSIGNORS, BY DIRECT AND MESNE ASSIGNMENTS, TO THE ANDERSON COMPANY, OF SOUTH BEND, INDIANA, A CORPORATION OF INDIANA.

COMBINED MOTOR AND FUEL CONTROL.

1,346,477. Specification of Letters Patent. Patented July 13, 1920.

Application filed November 6, 1916. Serial No. 129,846.

*To all whom it may concern:*

Be it known that we, (*a*) JOHN W. ANDERSON, Jr., and (*b*) ALBERT R. ANDERSON, citizens of the United States, residing at (*a*) Mishawaka, (*b*) Morgan Park, Chicago, in the county of (*a*) St. Joseph, (*b*) Cook, and State of (*a*) Indiana, (*b*) Illinois, have invented certain new and useful Improvements in Combined Motor and Fuel Control, of which the following is a specification.

Our invention relates to improvements in a combined fuel and motor control and it especially embodies the features pointed out in the annexed claims.

The purpose of our invention is to provide a control for internal combustion engines that is positively connected to the engine clutch and a fuel distributer which supplies different fuels to the engine carbureter so that when the clutch is off one kind of fuel is used and when the clutch is put on the other kind of fuel is automatically supplied instead of the former, or vice-versa.

The fuels ordinarily used are gasolene and petroleum, the former when the engine is running light and the latter when it is under load, or the more expensive fuel when the engine has little work to do and a cheaper fuel, having more heat units, when more work is to be done. This is accomplished through positive connections between a foot or other lever, a fuel valve and the engine clutch. A further purpose is to drain kerosene from the carbureter on releasing the clutch so that when restarting gasolene will always be present without requiring any attention from the driver.

Figure 1:
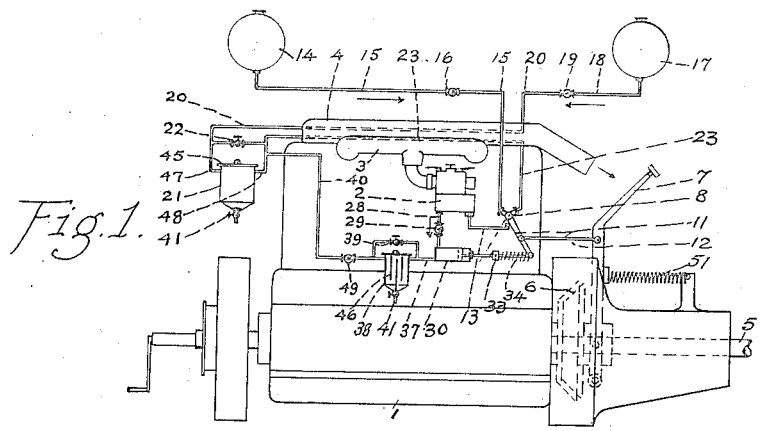

Figure 1— instances a diagrammatic relation of coöperating parts exemplifying an improved interconnection system of control.

Figures 2, 3:
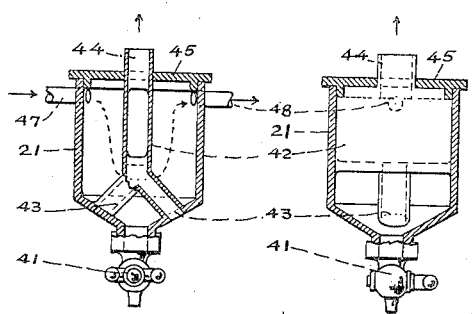

Fig. 2— is an elevation in section of an air cooled precipitating tank.

Fig. 3— is a sectional elevation of the tank at right angles to Fig. 2.

Figure 4:
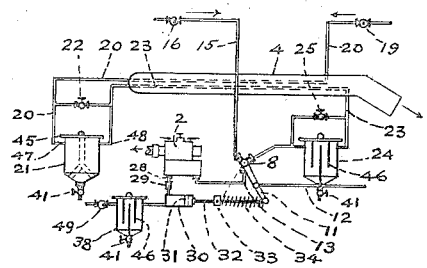

Fig. 4— is a diagrammatic view of an arrangement of parts showing an air cooled precipitating tank in tandem with a settling tank minus the air cooling feature, also a similar tank for the suction feature of a carbureter drainage system, all of the tanks or chambers being provided with by-passes and valves therein for use when required.

Figures 5, 6:
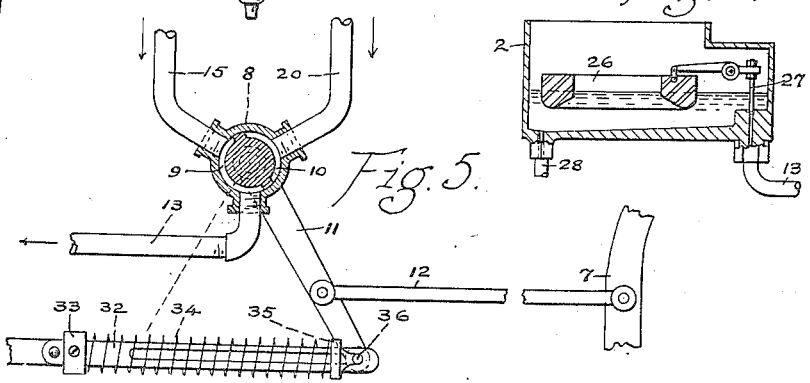

Fig. 5 is an enlarged view partly in section of a three-way valve and connections.

Fig. 6— is a cross section of the usual float and fuel valve common in carbureter practice.

Fig. 7— is a diagrammatic view showing the clutch out and the connections set for gasolene feed while the engine is running light.

Fig. 8— is a similar view to Fig. 7 instancing the change-over connection immediately thereafter when the clutch is set for load and kerosene is being used.

Fig. 9— is also a diagrammatic view disclosing the relation of parts when the clutch is again released.

Fig. 10— discloses the relation of connections, in diagrammatic form, the moment the clutch is again set so as to put a load on the newly started engine.

Heretofore it has been the practice to design special heating devices for the fuel, special carbureters, special gasolene starting expedients, etc., in order to utilize the cheaper and heavier fuel oils for power purposes on self propelled vehicles. When such efforts have been directed to stationary engines the results have been more uniformly successful than when motor cars, trucks, delivery cars, etc., have been supplied with petroleum instead of gasolene because the latter demands are exceedingly fluctuating and variable.

The one outstanding difficulty in the use of kerosene or the heavy oils is the formation in the carbureter, engine cylinders, etc., of deposits of carbon so that in a short time the system becomes quite inoperative. With many proposals gasolene is used as a starting medium by priming the cylinders and in some cases the two valves separately controlling the oil and gasolene are mechanically connected so that a movement by the hand will simultaneously operate both valves in order that one or the other valve will not be forgotten. Such means are however found inadequate because not being connected with the essential part of a car's power plant—the clutch—remain inactive or misapplied. In making a positive connection to the clutch the exact sequence of the operations is maintained and the degree of movement is definitely fixed so that there can be no omissions or forgotten steps.

It is noted that the terms oil, coal oil and kerosene used interchangeably are for the purpose of the description considered synonymous.

The special features of this system can be practically applied to any motor with substantially no changes whatever to the carbureter or to the usual engine details excepting that an engine 1 supplied with a carbureter 2 and intake manifold 3 has fuel pipes 20 and 23 placed in the exhaust manifold 4. All the other features are of an accessory order, being attachable in various positions as desired.

The usual driving shaft 5 is supplied with a clutch 6 placed between this shaft and the engine 1. A clutch lever 7 of any desired form is retracted by spring 51 and is connected to lever 11 of three-way valve 8 by link 12. This constitutes a very material and important connection for the successful operation of the engine on the heavier fuels without the handicap of prohibitive carbon deposits.

The freedom from obstructive carbon precipitation, academically considered, may be due to the positive alternate use of gasolene whenever the engine runs light and the heavier fuel when it is operating under load combined with the staged preheating of the heavier fuel, extracting any precipitates produced by carbonizing tendencies or otherwise before the carbureter is reached and to the drainage of oil from the carbureter after each clutch-driving period and possibly further to the freeing of the fuel from mechanical settlings, deposits, etc., so that the carbureter can operate at its highest efficiency all the time.

The three-way valve 8 has a gasolene passage way 9 and another similarly formed at 10 for the oil. A feed pipe 13 leads from the valve 8 to the carbureter 2. Gasolene supply tank 14 is connected to valve 8 by pipe 15 in which a check valve 16 is placed to prevent back-flow in the pipe.

Kerosene is stored in tank 17, from where it is led by pipe 18 to the check valves 19 through the pipe 20 placed in the exhaust manifold 4 so as to heat the fuel. From here it passes through an air cooled tank 21, a by-pass and valve 22 serving to practically eliminate the tank when for any cause this is found desirable. The fuel is again led through the exhaust manifold in pipe 23 to the three-way valve 8 for use in the carbureter as needed. In case a further removal of deposits, etc., is desired a plain tank 24 may be connected in tandem with tank 21 but in the latter case only sedimentation tendencies would be provided for without air cooling so as to leave the fuel quite hot. A by-pass and valve 25 serve the usual functions of such expedients to "cutout" the tank or chamber 24.

The carbureter 2 is provided with any well known type of float 26 that is connected to the valve 27 so as to control the supply of fuel. A drain 28 is attached beneath the carbureter, and a check valve 29 preventing flow toward the carbureter is placed in the drain pipe. The pipe 28 is connected to the suction pump 30, whose plunger 31 is attached to the slotted rod 32. The three-way valve 8 through its lever 11 is connected to the rod 32 by a pin 36 that is slidable in the slot of this lever. A collar 33 may be secured on rod 32 and a spring 34 threaded over the rod so as to have movement between collar 33 and washer 35 as the lever 11 is actuated.

An outlet 37 connects the pump 30 to a settling tank or chamber 38 in which foreign particles, road dust, etc., may be trapped from the fuel whenever the carbureter is drained through the suction of plunger 31. In effect this frequent drainage of the carbureter contents affords recurrent washings which will always maintain the carbureter in the best of condition. A by-pass and valve 39 may be used to open an alternative path around the pump.

From the chamber 38 a fuel return pipe 40 leads to pipe 23 through check valve 49 that prevents back flow toward the chamber 38. This fuel is led through pipe 23 placed in the exhaust manifold to the three-way valve 8 and fed to the carbureter as fast as the float 26 and the tension of spring 34 will admit until such fuel is all passed over when, without any attention whatever the main oil supply will continue to feed the carbureter as already described.

The tanks or chambers 21, 24 and 38 are provided with drain valves 41. The chamber 21 is supplied with a hollow baffle plate 42 that has air inlets 43 thereto and outlets 44 therefrom. Suitable covers are provided for these tanks, for 21 a special cover 45 may be used. In tanks 24 and 38 plain baffle partitions 46 are used to cause the precipitation of any sedimentation found in the fuel passing these plates. The chamber 21 is further provided with oil inlet 47 and an outlet 48 therefor.

Whatever quantity of galolene may be alternately drained from the carbureter will simply be refed to it via the three-way valve 8 and if the extra heating in pipe 23 is deleterious a cut off 50 reaching from check valve 29 to the oil side of the three-way valve may be installed as shown in Fig. 9.

An evident advantage of the system lies in the very frequent washings the carbureter fuel bowl receives, in the preheating of the heavier fuel, the interposition of a phase of fractional distillation in the oil supply pipe to catch any carbonizing tendencies before the carbureter is reached and to automatically bring about a coördination of functions through the one operation of putting the clutch on or off. This simplification means economic production, expeditious installation, and efficient operation. It causes the larger part of the available B. T. U's of the fuel to be usefully employed and eliminates vexing delays, etc., usually associated with the practical operation of heavy fuel systems.

The operation of the system may be summarized as follows: When the engine is running light, the clutch 7 being disconnected, gasolene from tank 14 is being supplied to the carbureter 2 through pipes 13, 15 and valve 8. The moment clutch 6 is engaged through a movement of lever 7 the link 12 shifts lever 11 into the position shown in dotted lines of Figs. 1 and 5 supplying oil from tank 17 over pipes 18, 20, 23 and 13 to carbureter 2. This movement of lever 11 is transferred to the plunger 31 through spring 34 abutting the block 33 on the slotted plunger rod 32. It shifts the plunger 31 to the extreme inner end of pump barrel 30.

As soon as the load is thrown off by releasing the clutch 7 the engine again runs light but before the gasolene feed is effective plunger 31 has been drawn back far enough by means of lever 11 and rod 32 to suck from the carbureter 2 through drain pipe 28 and check valve 29 all the oil contained in the carbureter bowl. Whatever quantity of gasolene that may follow will wash out the last remnant and leave only gasolene for further use. As soon as the pump plunger 31 has reached its extreme withdrawal flow in the drain pipe 28 will be stopped and as the capacity of the pump will about equal that of the carbureter the pump chamber up to check valve 29 will be filled with oil so that fresh gasolene cannot flow freely through the drain pipe. This condition will remain so long as the engine continues running light and will persist if it is stopped altogether.

As soon as it is to be restarted it can do so on gasolene alone without any further manipulations than turning it over a few times manually or by means of a starter. Thus no difficulty need ever be encountered in starting the engine on account of oil fuel being used for the heavy work. When the engine is again running the exhaust 4 will become quite hot so as to quickly effect oil feed pipes 20 and 23 and deliver the oil in prepared condition to the carbureter the movement lever 11 is shifted by a closure of clutch lever 7. This movement cannot be instantly carried to plunger 31 because the pump barrel is full of oil which cannot find an immediate return to the carbureter because float 26 keeps valve 27 closed until more fuel is required. In the meantime lever 11 moving into its new position compresses spring 34, its pin 36 sliding in the slot of rod 32. This puts the contents of pump 30 under an expelling pressure which will continue until its content is delivered back to the carbureter when immediately the oil fuel in pipe 20 will be available to continue the operation of the engine. The feed in all cases being as fast as the float 26 will permit. Further manipulation will repeat the order outlined.

It should also be understood that any alternative or modified expedient for usefully employing the power of the engine requiring additions to, or changes from, the elementary form of clutch control shown or special connections to the gear shifter, automatic starter or any other point of intermittent mechanical power or speed control is embodied in this invention. It is obvious that the specific exigencies of different motor uses will require diverse adaptations as for instance the sequence of clutch operations of a Ford car is quite different from that of numerous other cars, motor boats, etc. On well known types of cars connections may be made that will exclude certain repetitive modifications of control while picking one's way at low speed through congested traffic, etc., without compelling a change in fuels for each minor variation of the control mechanism. Such adaptations are peculiarly specific to different traffic conditions and power plant designs.

The use of the expressions, "clutch control", "setting of the clutch", "clutch is off", "clutch is on", "clutch movement", "connecting of the clutch," etc., in the claims is intended to include any means for intermittently utilizing power from the engine in whatever sequence or degree desired regardless of the specific adaptations diagrammatically shown in the drawings.

It is immaterial as to whether the clutch 6 is normally held out of action by means of a spring or that it is held engaged by it for these alternatives are practical equivalents as the lever 11 can be made to have the same direction of movement in both adaptations by interposing any well known reversing idler between the levers 7 and 11 or by shifting the fulcrum of lever 7 to the other side of shaft 5 and connecting link 12 to a projection of lever 11 extending above the center of valve 8, spring 51 being under tension in both cases. Since such alternatives are substantial equivalents and well known they are not illustrated.

What we claim is,

1. An internal combustion engine, power shafts connected therewith, a clutch therefor, a control lever to open and close the clutch, a three-way valve, connections from the valve to the control lever, a carbureter placed between the engine intake and the three-way valve, a plurality of fuel sources, connections from such sources to the carbureter, through the three-way valve interposed in such connections the same being adapted to supply fuel to the carbureter from one source when the clutch is on and from the other source when the clutch is off.

2. In a combined fuel and motor control an oil fuel supply, a gasolene supply, connections from both to the point of distribution, a carbureter adapted to alternately utilize either kind of fuel, an internal combustion engine, shafts driven thereby, a clutch interposed between the shafts, a lever to control the clutch so as to throw the same off and on, a three-way valve placed between the carbureter and the sources of fuel supply and a suitable link positively connecting the valve and clutch lever the same being so positioned with respect to the valve that when the clutch is off gasolene will be supplied to the carbureter and when the clutch is on oil will be supplied instead.

3. An internal combustion engine, a clutch connected therewith, an intake manifold for the engine, a carbureter attached to the manifold, an oil supply, an exhaust manifold, means for subjecting the oil supply to the heat of the exhaust, a gasolene supply, a three-way valve, separate connections thereto for the gasolene and oil and therefrom to the carbureter, and connections from the valve to the clutch whereby a movement of the latter will control the position of the former.

4. An internal combustion engine, power shafts, exhaust and intake manifolds connected with the engine, a clutch interposed between the power shaft, a clutch lever, an oil supply pipe subject to the heat of the exhaust, a carbureter adapted to handle the fuel, a link attached to the clutch lever, a gasolene supply, a three-way valve adapted to alternately control the supply of gasolene or oil to the carbureter, and means for connecting the clutch lever to the valve whereby on the setting of the clutch oil will be supplied and on the release of the clutch gasolene will be delivered to the carbureter.

5. In fuel control for internal combustion engines, a plurality of different fuel sources, a carbureter for utilizing the fuel, an engine supplied by the carbureter, a drive shaft driven by the engine, a clutch interposed between such shaft and the engine, means for operating the clutch, a fuel valve placed between the fuel sources and the carbureter, mechanical connections therefrom to the clutch operating means, a drainage system connected to the carbureter, and means for operating the same through a movement of the clutch manipulative mechanism.

6. An internal combustion engine, a carbureter therefor, a fuel control in the carbureter, a fuel intake to the engine, an exhaust manifold, a gasolene supply, an oil supply, means for leading the oil supply through the exhaust manifold to heat the same, a fuel selector serving both fuels, a connection therefrom to the carbureter, a driving shaft operated by the engine, a clutch therein, means for operating the same, and connections between the clutch operating means and the fuel selector whereby movement of said operating means is imparted to the fuel selector to change the kind of fuel delivered to the carbureter.

7. A volatile fuel source, a heavier fuel source, a carbureter, an engine fed thereby, means for changing from one fuel to the other, a clutch connection to the engine, means adapted to throw the clutch on or off, and means for positively connecting the fuel changer to the clutch control whereby the fuel changer cannot operate without a change of the clutch control.

8. A plurality of light and heavy fuel sources, a carbureter adapted to alternately use such fuels, an internal combustion engine supplied by the carbureter, means for first heating the fuel from one source by the products of combustion released from the engine, means for trapping out any accumulating particles after the first heating, means for again heating the fuel before delivering the same to the carbureter, a shaft driven by the engine, a clutch and means for operating the same, a fuel changer placed between the fuel sources and the carbureter, and connections therefrom to the clutch control.

9. In internal combustion engines, a gasolene source, an oil source, a carbureter supplying the engine from either source, means for heating the oil, means for extracting deposits therefrom before delivering the same to the carbureter, means for forcibly draining oil from the carbureter and redelivering it to the carbureter as needed, and means for supplying gasolene to the engine when running free and automatically changing to oil when the engine is connected to the load.

10. An internal combustion engine, a carbureter therefor, a gasolene supply, an oil supply, a drain from the carbureter, a three-way valve, separate connections from the drain to the oil and gasolene supply to the valve, a connection from the valve to the carbureter, means for heating the oil supply, means for collecting residue therefrom, means for removing any foreign particles from the drained fuel, and means for controlling the supply of fuel from either of the sources independently of each other through a change of position of said valve.

11. An internal combustion engine, means for intermittently using power from the engine in whatever sequence or degree desired, a fuel control, a carbureter placed between the engine intake and such control, separate fuel sources, connections therefrom to the control, coördinating means for automatically changing from one fuel source to the other, and means in connection with the latter for removing unvaporized fuel from the carbureter.

12. In internal combustion engines, a suitable engine, means adapted to intermittently utilize power from the engine, suitable separate fuel sources, means for controlling flow therefrom, means for vaporizing the fuel for the engine, and means for removing unused fuel from the vaporizing means when a change in fuel is required.

13. In fuel control for internal combustion engines, a plurality of fuel sources, a carbureter for utilizing the fuel, an engine supplied by the carbureter, means adapted to intermittently utilize power from the engine, a fuel valve placed between the fuel sources and the carbureter, connections thereto adapted to control the valve through intermittent application of the power, a drainage system connected to the carbureter, and means for coördinating the same with the fuel valve.

In testimony whereof we affix our signatures in the presence of two witnesses.

JOHN W. ANDERSON, Jr.
ALBERT R. ANDERSON.

Witnesses:
W. H. Delaney,
L. G. Moffet.